Figure 1:
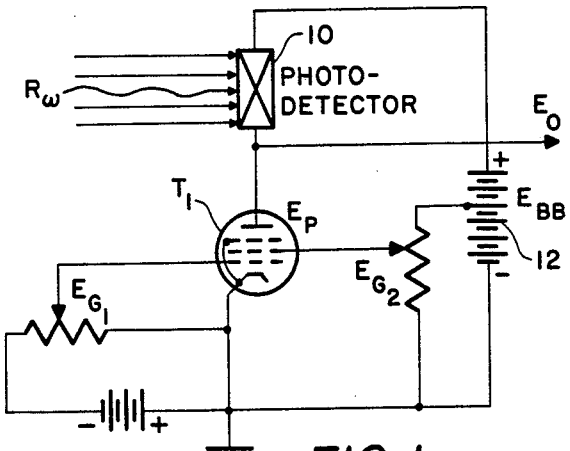

July 13, 1965 G. F. MASIN 3,194,968
PHOTODETECTOR CIRCUIT FOR THE DETECTION OF WEAK
RADIANT SIGNALS IN THE PRESENCE OF A LARGE
SIGNAL BACKGROUND
Filed Sept. 20, 1962

GEORGE F. MASIN
INVENTOR.

BY J. M. St. Amand

ATTORNEY

United States Patent Office 3,194,968
Patented July 13, 1965

3,194,968
PHOTODETECTOR CIRCUIT FOR THE DETECTION OF WEAK RADIANT SIGNALS IN THE PRESENCE OF A LARGE SIGNAL BACKGROUND
George F. Masin, Anaheim, Calif., assignor to the United States of America as represented by the Secretary of the Navy
Filed Sept. 20, 1962, Ser. No. 225,959
7 Claims. (Cl. 250—214)
(Granted under Title 35, U.S. Code (1952), sec. 266)

The invention herein described may be manufactured and used by or for the Government of the United States of America for governmental purposes without the payment of any royalties thereon or therefor.

The present invention relates to photodetectors and more particularly to enhancing the response of photodetectors to weak signals in the presence of large signal background.

The old classical methods normally used a resistor as an A.C. impedance in photodetector circuits. However, the disadvantages to the old method are: the resistor used for the A.C. load has essentially the same impedance to the D.C. bias supply voltage and hence there normally exists an undesirable voltage drop across the load resistor which allows less of the original bias voltage to appear across the photodetector; and, presence of a strong background radiation signal on the photodetector can reduce the magnitude of the desired weak signal produced by the desired source.

The present invention overcomes the disadvantages of older methods. Through the use of an electron tube having high A.C. plate impedance, but relatively low D.C. impedance, the optimum desired characteristics are achieved which require that photodetectors, when used as a voltage source, look into a low D.C. impedance while also looking into a very high A.C. impedance. When a photodetector is used as in the present invention the short circuit weak signal current of the photodetector is not significantly affected by the presence of a large steady-state radiant signal background. The short circuit current is the current developed due to radiant energy impinging upon the photodetector. The short circuit weak-signal current is that current developed in the photodetector due to the weak signal (i.e., the radiant energy other than that due to the large steady-state background). The older methods employing a resistor photodetector load suffer serious degradation in that weak signals tend to become less detectable and finally degrade to virtually zero, when a steady-state radiant signal background is present.

It is an object of the invention therefore to provide improvement in photodetector weak signal response through the use of an electron tube as a photodetector load impedance.

Another object of the invention is to provide a circuit for improving the detection of weak radiant signals in the presence of large signal background.

Still another object of the invention is to provide a convenient means for obtaining a high A.C. impedance while retaining a relatively low value of D.C. impedance in photodetector circuits.

It is a further object of the invention to provide a photodetector circuit wherein the short circuit weak signal current of the photodetector is not significantly affected by the presence of a large steady-state radiant signal background.

Figure 2:
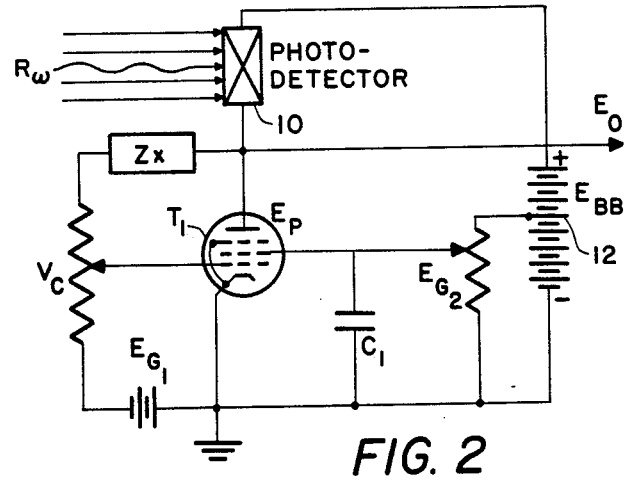
Figure 3:
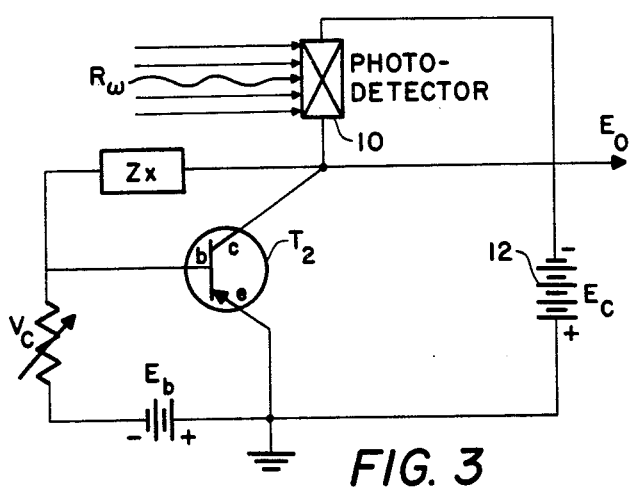

Other objects and many of the attendant advantages of this invention will become readily appreciated as the same becomes better understood by reference to the following detailed description when considered in connection with the accompanying drawings wherein:

FIG. 1 shows a circuit diagram of an embodiment of the invention;
FIG. 2 shows a circuit diagram of another embodiment of the invention depicting inclusion of a phase shifting network;
FIG. 3 shows another embodiment of the invention having transistor application.

Referring now to the drawings, like reference characters refer to similar parts in each of the figures.

With reference to FIG. 1, the classical equation relating output voltage $E_O$ of photodetector 10 to the voltage $E_{BB}$ of bias battery 12, the resistance $R_C$ of the photodetector 10, and the photodetector load impedance $R_L$ is:

$$E_O = \frac{KE_{BB}(4R_CR_L)}{(R_C+R_L)^2} \qquad (1)$$

In the usual old circuit configurations, instead of an electron tube $T_1$, the load impedance ($R_L$) is a resistor of the same order as ($R_C$), the photodetector resistance, and hence it can be seen in the small signal case, for example, where $R_C=1$ megohm, $R_L=1$ megohm, and $E_{BB}=150$ volts.

$$E_O = \frac{K \cdot 75(4 \times 10^{12})}{4 \times 10^{12}} = K(75) \qquad (2)$$

Also, in the usual old configuration where a radiant signal of large intensity is incident on the photodetector 10 (i.e. $R_C$, photodetector resistance, now becomes 0.1 megohm) substitution in Equation 1 yields $$E_O = \frac{K \cdot 14(4 \times 10^{11})}{(1.2 \times 10^{12})} = K(4.7) \qquad (3)$$

Note the serious degradation in output in Equation 3 as compared to Equation 2.

Now in the present case, where a typical pentode or tetrode tube $T_1$ (having characteristic high resistance $R_P = .5$ to 1.0 megohm) is employed, due to the fact that the above type tube has a very high A.C. impedance $$\frac{\Delta E_P}{\Delta I_P}$$

(typical value 1 megohm) while having a relatively low D.C. impedance $$\frac{E_P}{I_P}$$

(typical value 20,000 ohms) one can substitute in the above equations for both small and large signal cases thus:

Small signal case $$E_O = \frac{K \cdot 120(4 \times 10^{12})}{(4 \times 10^{12})} = K(120) \qquad (4)$$

note some improvement over Equation 2.

Large signal case $$E_O = \frac{K \cdot 120(4 \times 10^{11})}{(1.2 \times 10^{12})} = K(40) \qquad (5)$$

or nearly ten times improvement over the large signal case of Equation 3.

Through the use of positive feedback network $Z_X$ as shown in FIG. 2 the A.C. impedance of tube $T_1$ may be increased by a factor 10 to 20 times over a narrow band of frequencies, where such design is advantageous, with an attendant improvement in signal to noise ratio, thus having application to many optical detector systems where a chopper is used to modulate the incoming radiant energy at the same angular frequency $R_W$. Phase shift network $Z_X$ provides phase shift of approximately 180 degrees to provide regenerative function at signal frequency $R_W$. $V_C$ is the regenerative amplitude control.

Since transistor collector voltage versus collector current exhibit charactersitics similar to the pentode tube (i.e. high collector A.C. impedance while the D.C. impedance is relatively low) the same explanation as above will in general apply to the transistor circuit shown in FIG. 3, where $T_2$ is a transistor having high $R_C$ in place of an electron tube $T_1$ as in FIG. 2.

Obviously many modifications and variations of the present invention are possible in the light of the above teachings. It is therefore to be understood that within the scope of the appended claims the invention may be practiced otherwise than as specifically described.

What is claimed is:

1. A photodetector circuit for improving the detection of weak radiant signals in the presence of large signal background, comprising:
    (a) a photodetector,
    (b) a photodetector load impedance consisting of a multigrid electron vacuum tube circuit having high A.C. plate impedance and relatively low D.C. impedance in series with said photodetector,
    (c) a source of D.C. bias supply voltage connected to said photodetector and electron tube and in series therewith,
    (d) said photodetector being operable to detect radiant energy signals which impinge thereon and generate an output in response to said radiant energy signals,
    (e) any short circuit weak signal current of said photodetector not being significantly affected by the presence of a large steady state radiant signal background and degradation of said weak signal to where the said weak signal becomes less detectable and finally degrades to virtually zero being lacking.

2. A photodetector circuit for improving the detection of weak radiant signals in the presence of large signal background, comprising:
    (a) a photodetector,
    (b) a photodetector load impedance means having high A.C. impedance and relatively low D.C. impedance in series with said photodetector,
    (c) a source of D.C. bias supply voltage connected to said photodetector and photodetector load impedance means and in series therewith,
    (d) said photodetector being operable to detect radiant energy signals which impinge thereon and generate an output in response to said radiant energy signals,
    (e) any short circuit weak signal current of said photodetector not being significantly affected by the presence of a large steady state radiant signal background and degradation of said weak signal to where the said weak signal becomes less detectable and finally degrades to virtually zero being lacking.

3. A photodetector circuit for improving the detection of weak radiant signals in the presence of large signal background, comprising:
    (a) a photodetector,
    (b) a photodetector load impedance consisting of a multigrid electron vacuum tube circuit having high A.C. plate impedance and relatively low D.C. impedance in series with photodetector,
    (c) a source of D.C. bias supply voltage connected to said photodetector and electron tube and in series therewith,
    (d) a positive feedback network included in said vacuum tube circuit for increasing the impedance thereof over a narrow band of frequencies with improvement in signal to noise ratio,
    (e) said photodetector being operable to detect radiant energy signals which impinge thereon and generate an output in response to said radiant energy signals,
    (f) any short circuit weak signal current of said photodetector not being significantly affected by the presence of a large steady state radiant signal background and degradation of said weak signal to where the said weak signal becomes less detectable and finally degrades to virtually zero being lacking.

4. A circuit as in claim 3 wherein said phaseshift network provide phase shift of approximately 180 degrees to provide regenerative function at signal frequency.

5. A photodetector circuit for improving the detection of weak radiant signals in the presence of large signal background, comprising:
    (a) a photodetector,
    (b) a photodetector load impedance consisting of a multigrid electron vacuum tube circuit having high A.C. plate impedance and relatively low D.C. impedance in series with said photodetector,
    (c) a source of D.C. bias supply voltage connected to said photodetector and electron tube and in series therewith,
    (d) means included with said load impedance means for increasing the impedance of said load impedance means over a narrow band of frequencies with improvement in the signal to noise ratio of said photodetector,
    (e) said photodetector being operable to detect radiant energy signals which impinge thereon and generate an output in response to said radiant energy signals,
    (f) any short circuit weak signal current of said photodetector not being significantly affected by the presence of a large steady state radiant signal background and degradation of said weak signal to where the said weak signal becomes less detectable and finally degrades to virtually zero being lacking.

6. A photodetector circuit for improving the detection of weak radiant signals in the presence of large signal background, comprising:
    (a) a photodetector,
    (b) a photodetector load impedance consisting of a transistor circuit having high collector A.C. impedance and relatively low D.C. impedance connected in series with said photodetector,
    (c) a source of D.C. bias supply voltage connected to said photodetector and said transistor and in series therewith,
    (d) a positive feedback network included in said transistor circuit for increasing the impedance thereof over a narrow band of frequencies with improvement in signal to noise ratio,
    (e) said photodetector being operable to detect radiant energy signals which impinge thereon and generate an output in response to said radiant energy signals,
    (f) any short circuit weak signal current of said photodetector not being significantly affected by the presence of a large stead state radiant signal background and degradation of said weak signal to where the said weak signal becomes less detectable and finally degrades to virtually zero being lacking.

7. A circuit as in claim 6, wherein said phase shift network provides phase shift of approximately 180 degrees to provide regenerative function at signal frequency.

References Cited by the Examiner

UNITED STATES PATENTS

| | | | |
|---|---|---|---|
| 2,345,501 | 3/44 | Pineo | 250—214 |
| 2,835,825 | 5/58 | Joyce | 250—214 |
| 2,849,623 | 8/58 | Drake | 250—214 |
| 2,945,131 | 7/60 | Astheimer | 250—214 |
| 2,954,475 | 9/60 | White | 250—214 X |
| 3,005,915 | 10/61 | White et al. | 250—214 |

RALPH G. NILSON, *Primary Examiner.*

MAYNARD R. WILBUR, *Examiner.*